(12) United States Patent
Huang et al.

(10) Patent No.: US 12,449,479 B2
(45) Date of Patent: Oct. 21, 2025

(54) TESTING SYSTEM FOR INTEGRATED CIRCUIT DEVICE, AND SIGNAL SOURCE AND POWER SUPPLYING APPARATUS

(71) Applicant: NANYA TECHNOLOGY CORPORATION, New Taipei (TW)

(72) Inventors: Chung-Wei Huang, Taoyuan (TW); Wei-Te Shen, Taoyuan (TW); Chia-Ping Liao, New Taipei (TW); Kai-Li Liu, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 967 days.

(21) Appl. No.: 17/564,514

(22) Filed: Dec. 29, 2021

(65) Prior Publication Data

US 2022/0413043 A1    Dec. 29, 2022

(30) Foreign Application Priority Data

Jun. 28, 2021 (TW) ................................ 110123609

(51) Int. Cl.
*G01R 31/317* (2006.01)
*G05F 1/46* (2006.01)

(52) U.S. Cl.
CPC ......... *G01R 31/31721* (2013.01); *G05F 1/46* (2013.01)

(58) Field of Classification Search
CPC ........ G01R 31/31721; G01R 31/31924; G01R 31/2851; G01R 1/28; G01R 31/2834; G05F 1/46; H02M 1/00
See application file for complete search history.

(56) References Cited

U.S. PATENT DOCUMENTS

| 6,055,655 | A  | * | 4/2000  | Momohara | G11C 29/56 257/E27.081 |
| 2002/0186037 | A1 | * | 12/2002 | Eldridge | G01R 31/31721 324/754.07 |
| 2009/0273358 | A1 | * | 11/2009 | Arkin | G01R 1/07307 324/756.03 |

(Continued)

FOREIGN PATENT DOCUMENTS

| TW | 201112249 A | 4/2011 |
| TW | 201712686 A | 4/2017 |
| TW | 201935471 A | 9/2019 |

OTHER PUBLICATIONS

Quick Start, SPD3303X/3303X-E Programmable DC Power Supply, Siglent Technologies Co., Ltd, 2015 (Year: 2015).*

(Continued)

*Primary Examiner* — Daniel R Miller
(74) *Attorney, Agent, or Firm* — Xuan Zhang

(57) ABSTRACT

The present application discloses a testing system for integrated circuit device, and signal source and power supplying apparatus. The signal source provides a plurality of supply voltages and a programmable voltage to a plurality of semiconductor chip groups. The signal source includes a power supplying apparatus and a switch set. The power supplying apparatus is configured to generate an additional voltage, a plurality of base voltages, and the programmable voltage. The switch set is disposed between the power supplying apparatus and the plurality of semiconductor chip groups and converts the additional voltage and the plurality of base voltages into the plurality of supply voltages.

15 Claims, 10 Drawing Sheets

(56) References Cited

U.S. PATENT DOCUMENTS

2012/0218817 A1  8/2012  Kang et al.
2013/0010539 A1  1/2013  Shim et al.

OTHER PUBLICATIONS

Instek GPE-4323 4 Channels, 212W Linear DC Power Supply, available Amazon.com on Feb. 12, 2017 (Year: 2017).*
Programmable DC Power Supply, GPP-1326/GPP-2323/GPP-3323/GPP-4323, User Manual, Gw Instek, downloaded Feb. 20, 2025 from https://www.tequipment.net/Instek/GPP-4323-(LAN)/DC-Power-Supplies/Lab-Power-Supplies/?Source=googleshopping&gad_source=1&gclid=EAlalQobChMIgluEspLTiwMVyUtHAROIQxptEAQYASABEgLIF_D_BwE (Year: 2025).*
Office Action mailed on Jun. 13, 2022 related to Taiwanese Application No. 110123609.
Summary translation of Office Action mailed on Jun. 13, 2022 related to Taiwanese Application No. 110123609.

* cited by examiner

TESTING SYSTEM FOR INTEGRATED CIRCUIT DEVICE, AND SIGNAL SOURCE AND POWER SUPPLYING APPARATUS

TECHNICAL FIELD

The present disclosure relates to a testing system for integrated circuit device, and a signal source and power supplying apparatus, and more particularly, to a testing system for integrated circuit device, and a signal source and power supplying apparatus capable of improving testing capability by power distribution.

DISCUSSION OF THE BACKGROUND

In the manufacturing process of integrated circuit devices, the test procedure is an important step to ensure the normal function of the device. In a typical test procedure, automated test equipment (ATE) is used to generate test signals. ATE is coupled to a wafer prober station. The wafer prober station provides test signals to the device-under-test (DUT) through probe heads and probe cards. By measuring the response of the tested object to the test signals, for example, the signals obtained by measurement and/or quantification, it may be recognized whether the operation and/or performance of the tested object is normal.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One embodiment of the present disclosure provides a signal source including a power supplying apparatus and a switch set. The power supplying apparatus is configured to generate an additional voltage, a plurality of base voltages, and a programmable voltage. The switch set is disposed between the power supplying apparatus and a plurality of the semiconductor chip groups to convert the additional voltage and the plurality of base voltages into a plurality of supply voltages.

In one embodiment of the present disclosure, the switch set includes a first switch coupled between the power supplying apparatus and the plurality of semiconductor chip groups and located on the transmission path of the additional voltage.

In one embodiment of the present disclosure, the switch set includes a plurality of second switches electrically coupled between the power supplying apparatus and the plurality of the semiconductor chip groups and located on the transmission path of the plurality of base voltages.

In one embodiment of the present disclosure, the additional voltage is transmitted to the plurality of semiconductor chip groups through the plurality of second switches.

In one embodiment of the present disclosure, when the second switches switch to a conducting state, the power supplying apparatus provides a base current to each of the semiconductor chip groups; when the first switch switches to a conducting state, the power supplying apparatus provides an additional current to each of the semiconductor chip groups. The additional current is less than the base current.

In one embodiment of the present disclosure, the switch set further includes a plurality of third switches coupled between the power supplying apparatus and the plurality of semiconductor chip groups and located on the transmission path of the programmable voltage.

In one embodiment of the present disclosure, when the plurality of third switches switch to a conducting state, the power supplying apparatus provides a programmable current to each of the semiconductor chip groups. The programmable current is less than the additional current.

In one embodiment of the present disclosure, the programmable current is equal to the base current.

In one embodiment of the present disclosure, the signal source further includes a controller electrically connected to the first switch, the plurality of second switches, and the plurality of third switches. The first switch, the plurality of second switches, and the plurality of third switches are controlled by the controller and switch between the conducting state and an open circuit state.

In one embodiment of the present disclosure, the power supplying apparatus includes a first power supply configured to generate the additional current, a second power supply configured to generate the plurality of base currents, and a third power supply configured to generate the programmable voltage.

Another embodiment of the present disclosure provides a testing system including a first chip, a second chip, and a power supplying apparatus. The power supplying apparatus includes a first power supply configured to generate an additional current, and a second power supply configured to generate a first base current and a second base current. One of the additional current and the first base current is supplied to the first chip, and the additional current and the second base current are supplied to the second chip.

In one embodiment of the present disclosure, the testing system further includes a first switch, wherein the additional voltage of the first power supply is transmitted to the first chip and the second chip through the first switch.

In one embodiment of the present disclosure, the testing system further includes a plurality of second switches, wherein the additional voltage of the first power supply and the first base current and the second base current of the second power supply are transmitted to the first chip and the second chip through the plurality of second switches respectively.

In one embodiment of the present disclosure, the testing system further includes a third power supply configured to generate a programmable voltage to the first chip and the second chip.

In one embodiment of the present disclosure, the first chip further includes a first contact pad, the second chip further includes a second contact pad, and the programmable voltage enters the first chip through the first contact pad, the programmable voltage enters the second chip through the second contact pad.

In one embodiment of the present disclosure, the testing system further includes a plurality of third switches, the programmable voltage of the third power supply is transmitted to the first chip and the second chip through the plurality of third switches.

Another embodiment of the present disclosure provides a power supplying apparatus including a first power supply providing an additional voltage, a second power supply providing a base voltage, and a third power supply configured to provide a programmable voltage. The first power supply is electrically coupled to the second power supply to generate a combined current.

In one embodiment of the present disclosure, the power supplying apparatus further includes a first switch, wherein the additional voltage of the first power supply is transmitted to the first chip and the second chip though the first switch.

In one embodiment of the present disclosure, the power supplying apparatus further includes a plurality of second switches, wherein the additional voltage of the first power supply and the first base current and the second base current of the second power supply are transmitted to the first chip and the second chip through the plurality of second switches respectively.

In one embodiment of the present disclosure, the first chip further includes a first contact pad, the second chip further includes a second contact pad, and the programmable voltage enters the first chip through the first contact pad, the programmable voltage enters the second chip through the second contact pad.

In one embodiment of the present disclosure, the power supplying apparatus further includes a plurality of third switches, the programmable voltage of the third switches is transmitted to the first chip and the second chip through the plurality of third switches respectively.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1:
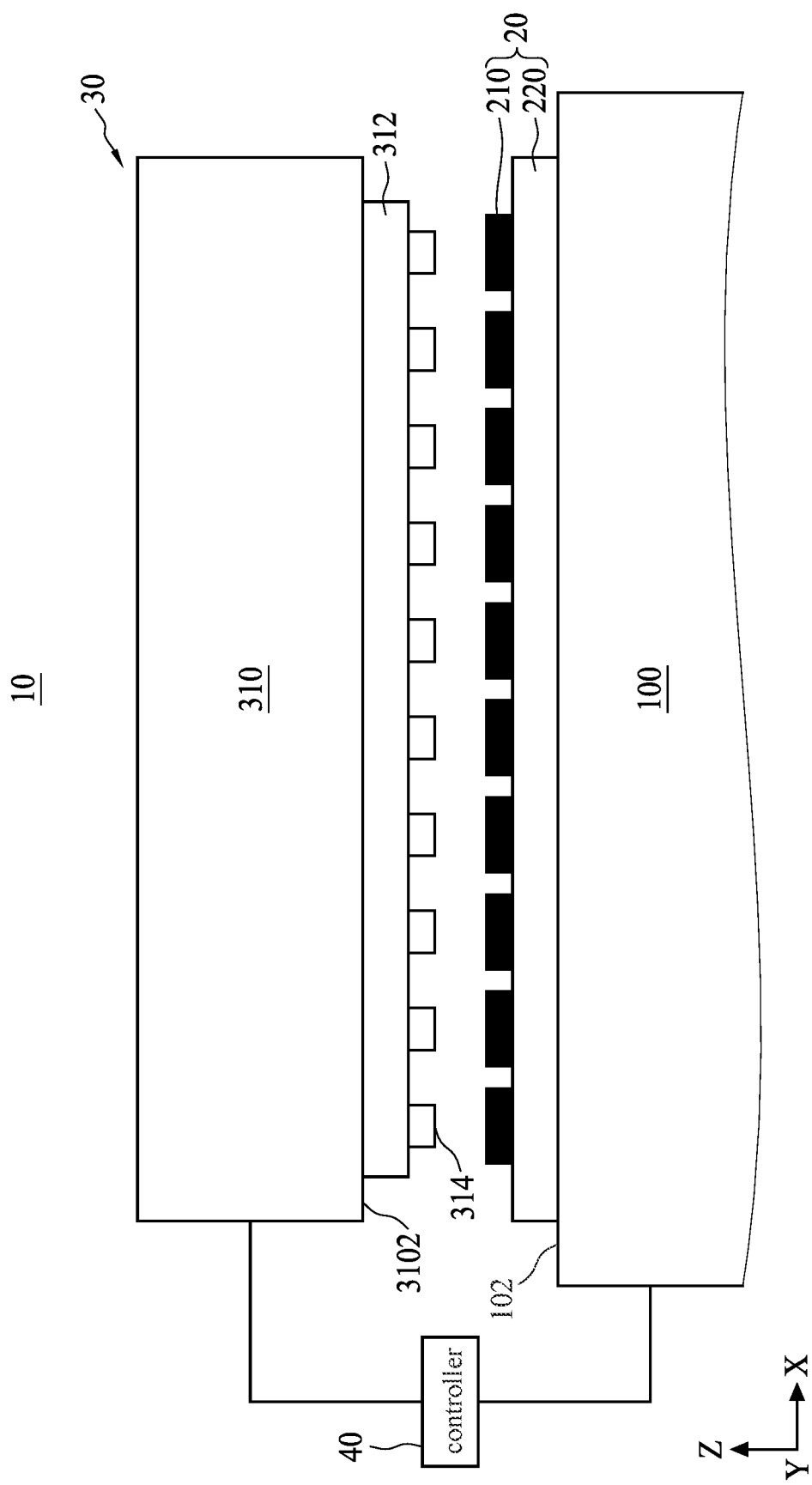
FIG. 1 is a schematic diagram illustrating a testing system in accordance with one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a schematic diagram of a testing system 10 of the present disclosure. With reference to FIG. 1, the testing system 10 includes a tested object 20 and a testing system 30. The testing system 30 is configured to test the action and/or performance of a plurality of semiconductor chips 210 in the tested object 20, and then determine whether the performance of each semiconductor chip 210 meets the design specification.

Figure 2:
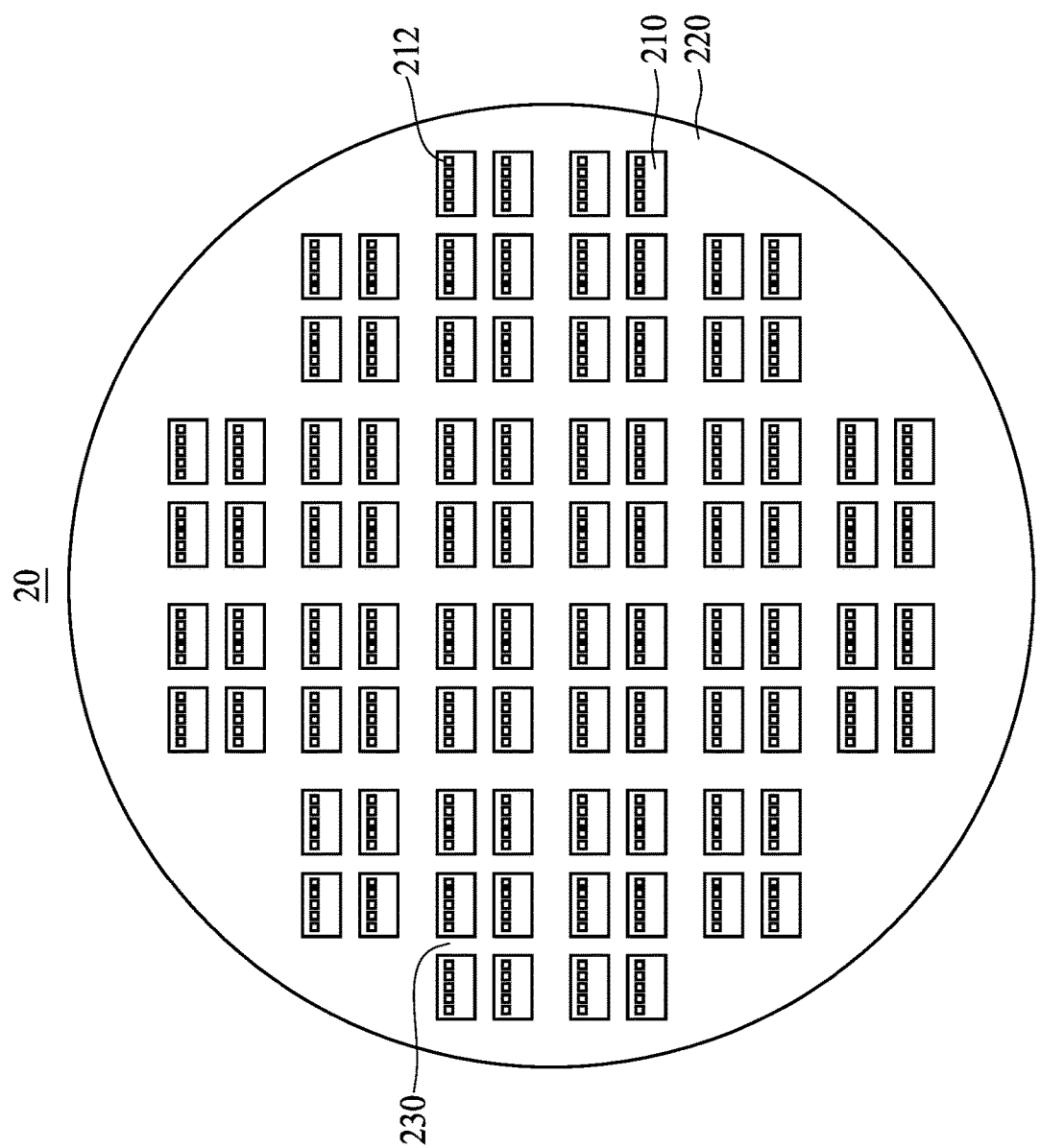
FIG. 2 is a top-view diagram illustrating a tested object in accordance with one embodiment of the present disclosure.

FIG. 2 illustrates a top-view diagram of the tested object 20 of the present disclosure. With respect to FIG. 2, the tested object 20 may include a semiconductor wafer 220 such as a silicon wafer. The surface of the semiconductor wafer 220 is divided into a plurality of functional areas by a plurality of dividing predetermined lines 230 intersecting each other, and the semiconductor chips 210 are located within the functional areas respectively. In other words, adjacent semiconductor chips 210 are separated by the dividing predetermined lines 230. Each semiconductor chip 210 may include one or more active components such as diodes, transistors, one or more passive components such as resistors, capacitors, and a plurality of patterned interconnect features used to electrically couple the active components and passive components. The active components, passive components, and interconnect features are formed in the semiconductor wafer 220 and/or on the surface of the semiconductor wafer 220 by a series of manufacturing processes of integrated circuit devices including doping, deposition, photolithography, etching, planarization, and the like. Typically, the semiconductor chips 210 of the tested object 20 have the same structure. Herein, the semiconductor chips 210 are memories, for example, dynamic random-access memories including metal-oxide-semiconductor transistors and capacitors.

A plurality of contact pads 212 are disposed on the semiconductor chip 210 and may be electrically connected to different active components, passive components, or a combination of the active components and passive components in the semiconductor chip 210. Accordingly, when the tested object 20 is tested, the testing system 30 may test the electrical characteristics of the active components, the passive components, and the electrical paths composed of the active components and the passive components through the contact pads 212 so as to ensure the quality of each semiconductor chip 210. The contact pads 212 are mainly fabricated by metal materials such as copper and aluminum. In FIG. 2, the contact pads 212 of each semiconductor chip 210 are arranged in a straight line, and two adjacent contact pads 212 are separated by a first distance D1. In some embodiments, the contact pads 212 may be arranged in a matrix or other shapes that facilitate the test of the testing system 30.

With reference to FIG. 1, before singulating the fabricated semiconductor chips 210, the testing system 30 detects the tested object 20 to identify the semiconductor chip 210 that does not meet the requirements of the manufacturing processes. The singulation of the semiconductor chip 210 is to cut the semiconductor wafer 220 along the dividing predetermined line 230 by a mechanical saw or a laser to form a plurality of independent chips, and each chip includes at least one semiconductor chip 210. In other words, the testing system 30 is mainly used to perform a wafer level test on the tested object 20.

Figure 3:
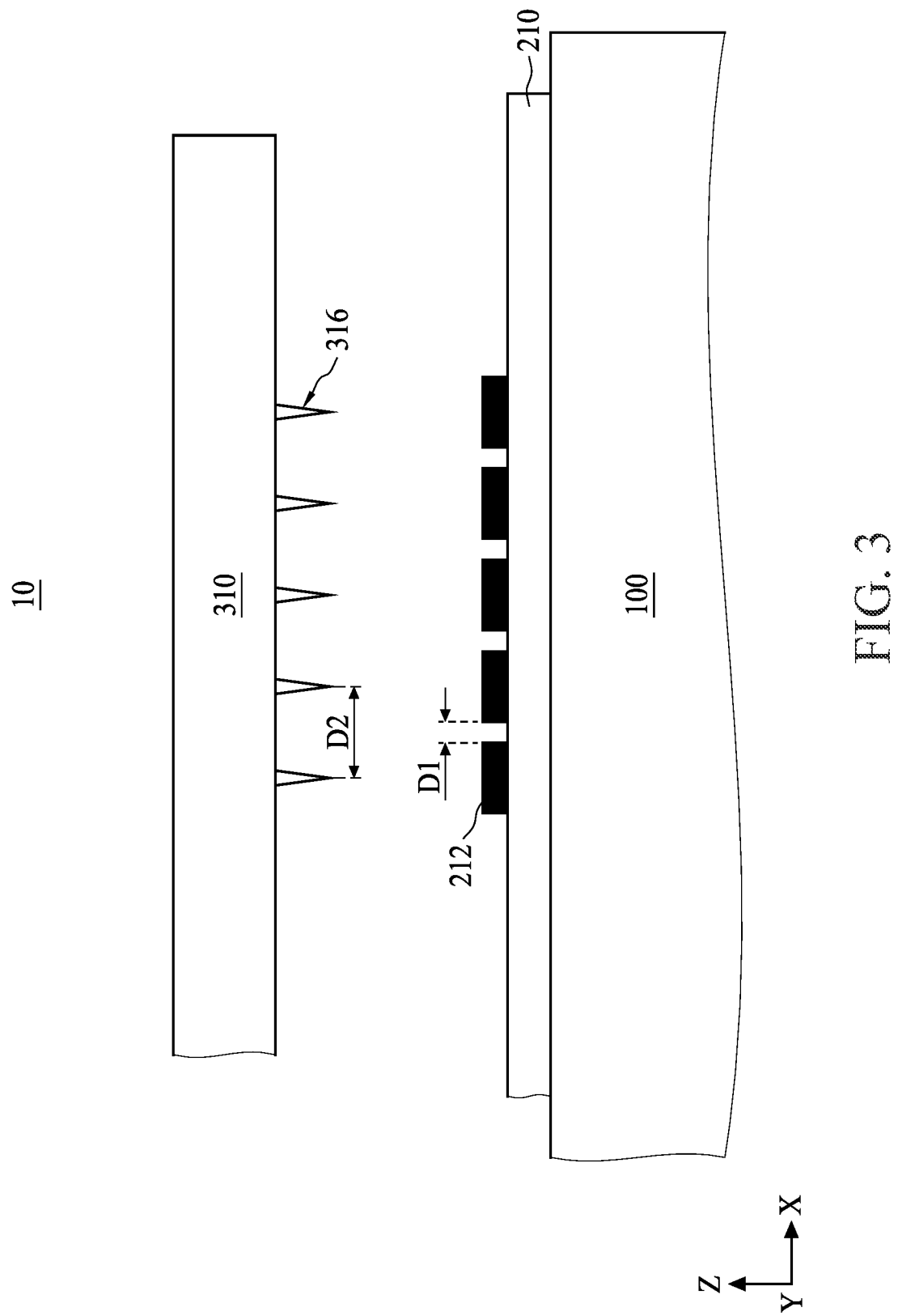
FIG. 3 is a schematic diagram illustrating a probe set and a semiconductor chip in accordance with one embodiment of the present disclosure.

With reference to FIG. 1 and FIG. 3, the testing system 30 includes a body 310 and a test card 312. The body 310 may have an installation surface 3102, and the test card 312 is fixed on the installation surface 3102 of the body 310. In some embodiments, the test card 312 may be secured on the body 310 with screws (not shown). When the body 310 is driven by the controller 40 to translate (i.e., move in the direction XY) or lift (i.e., move in the direction of axis Z), the position of the test card 312 changes accordingly. The test card 312 is provided with a plurality of probe sets 314, and each probe set 314 includes a plurality of probes 316, as shown in FIG. 3. The probes 316 are mainly fabricated by conductive materials which may be selected from, for example, platinum, rhodium, palladium, silver, copper, iridium, or alloys thereof. A conductive trace (not shown) may be disposed on the surface of the test card 312 to electrically connect the corresponding probes 316 in the probe sets 314. For example, the conductive trace may electrically connect the probes 316 on the leftmost side of each probe set 314. In other words, in addition to providing the installation of probes 316, the test card 312 can also transmit electrical signals. In some embodiments, the test card 312 includes a print circuit board.

With reference to FIG. 3, the probes 316 may be vertical probes or cantilever probes. The vertical probes provide elastic force mainly by buckling. The vertical probes have characteristics such as small volume and easy assembling and replacement. Due to the small distance between tips, the cantilever probes are suitable for performing electrical test on semiconductor chips 210 with narrow-pitch contact pads 212. In some embodiments, the number of the probe sets 314 is equal to the number of the semiconductor chips 210 on the tested object 20, and the number of the probes 316 may be equal to the number of the contact pads 212, so that the testing time can be effectively reduced. Also, in each probe set 312, a second distance D2 between the tips of two adjacent probes 316 is not less than a first distance D1 between two adjacent contact pads 212, thereby avoiding the transmission of false test signals to the components or electrical paths in the semiconductor chips 210, which may cause incorrect testing results or even damage the components in the semiconductor chips 210.

With reference to FIG. 1, the testing system 10 may further include a platform 100 having a bearing surface 102. The bearing surface 102 faces the probe card 312. Before testing, the spacing between the tip of probes 316 and the bearing surface 102 of the platform 100 is greater than the height of the tested object 20 so as to facilitate the placement of the tested object 20. The platform 100 and the testing system 30 may be electrically connected to the controller 40 respectively. After the semiconductor chip 210 is fabricated, the tested object 20 is loaded on the bearing surface 102 of the platform 100 to prepare for the test. When the tested object 20 is under test, the controller 40 first moves the platform 100 or the testing system 30 horizontally, so that the probes 316 of the probe card 312 is aligned with the contact pads 212 of the semiconductor chips 210. Then, the controller 40 may descend the probe card 312 of the testing system 30 so that the probes 316 and the corresponding contact pads 212 are in contact. In some embodiments, after the probes 316 are aligned with the contact pads 212, the controller 40 may vertically raise the platform 100 so that the probes 316 and the contact pads 212 are in contact. The controller 40 may be configured to have a high testing function, so that the probes 316 and the contact pads 212 are in contact with each other while the probes 316 do not compress the positions of the contact pads 212. As a result, the destruction of the semiconductor chips 210 and the breakage of the probes 316 may be prevented.

Figure 4:
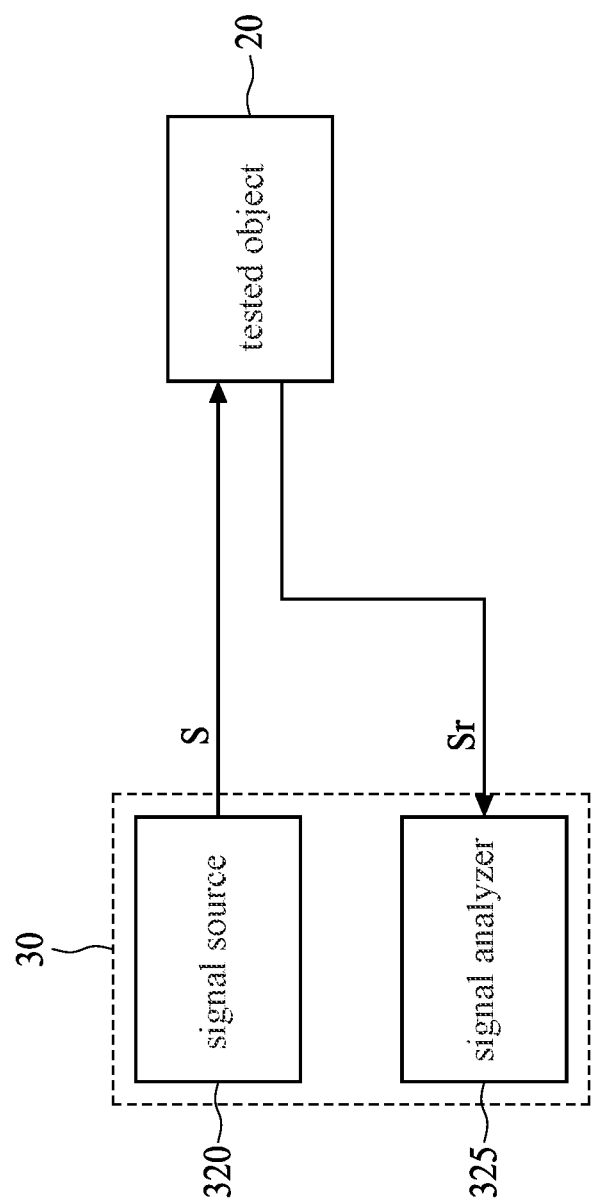
FIG. 4 is a circuit block diagram illustrating the transmission of electrical signals and response signals between the testing system and the tested object in accordance with one embodiment of the present disclosure.

With reference to FIGS. 3 and 4, after the probes 316 are in contact with the corresponding contact pads 212, a plurality of electrical signals S generated from the testing system 30 may be transmitted to the semiconductor chips 210 through the probes 316 to electrically test the components and/or electrical paths composed of a plurality of components in the semiconductor chips 210. The testing parameters and contents of the components or electrical paths in the semiconductor chips 210 may be adjusted according to the requirements of design or use.

With reference to FIG. 4, the testing system 30 includes at least one signal source 320 and generates at least one electrical signal S. For example, the signal source 320 may be placed in the body 310 of the testing system 30 and electrically connect to the test card 312 through conductive wires (not shown). The electrical signal S transmitted to the test card 312 may be transmitted to the probes 316 through the conductive traces on the surface of the test card 312 and the conductive traces therein. When the semiconductor chips 210 are semiconductor memories such as dynamic random-access memories, the electrical signals generated from the signal source 320 may include commands suitable for performing writing and reading tests on the semiconductor chips 210.

With reference to FIG. 4, the testing system 30 further includes a signal analyzer 325 receiving the response signals Sr provided by the semiconductor chips 210. The response signals Sr may represent the response of the components or electrical paths in the semiconductor chips 210 to the electrical signals S provided by the testing system 30. The testing system 30 may determine the basic electrical characteristics of each semiconductor chip 210 by analyzing the response signals. After testing the basic electrical characteristics of the semiconductor chips 210, the testing system 10 can also mark the defective semiconductor chips 210 to save the cost of packaging and testing. In some embodiments, in addition to transmitting the electrical signals S to the semiconductor chips 210, part of the probes 316 in the probe sets 314 can also transmit the response signals Sr provided by the semiconductor chips 210 to the testing system 30.

With reference to FIG. 4, the electrical signals generated from the signal source 320 may further include a power signal used to drive the semiconductor chips 210. Specifically, the signal source 320 of the testing system 30 may include one or more power supplying apparatuses 330 to generate the voltage and current required for the semiconductor chips 210 to perform the writing test and reading test.

Figure 5:
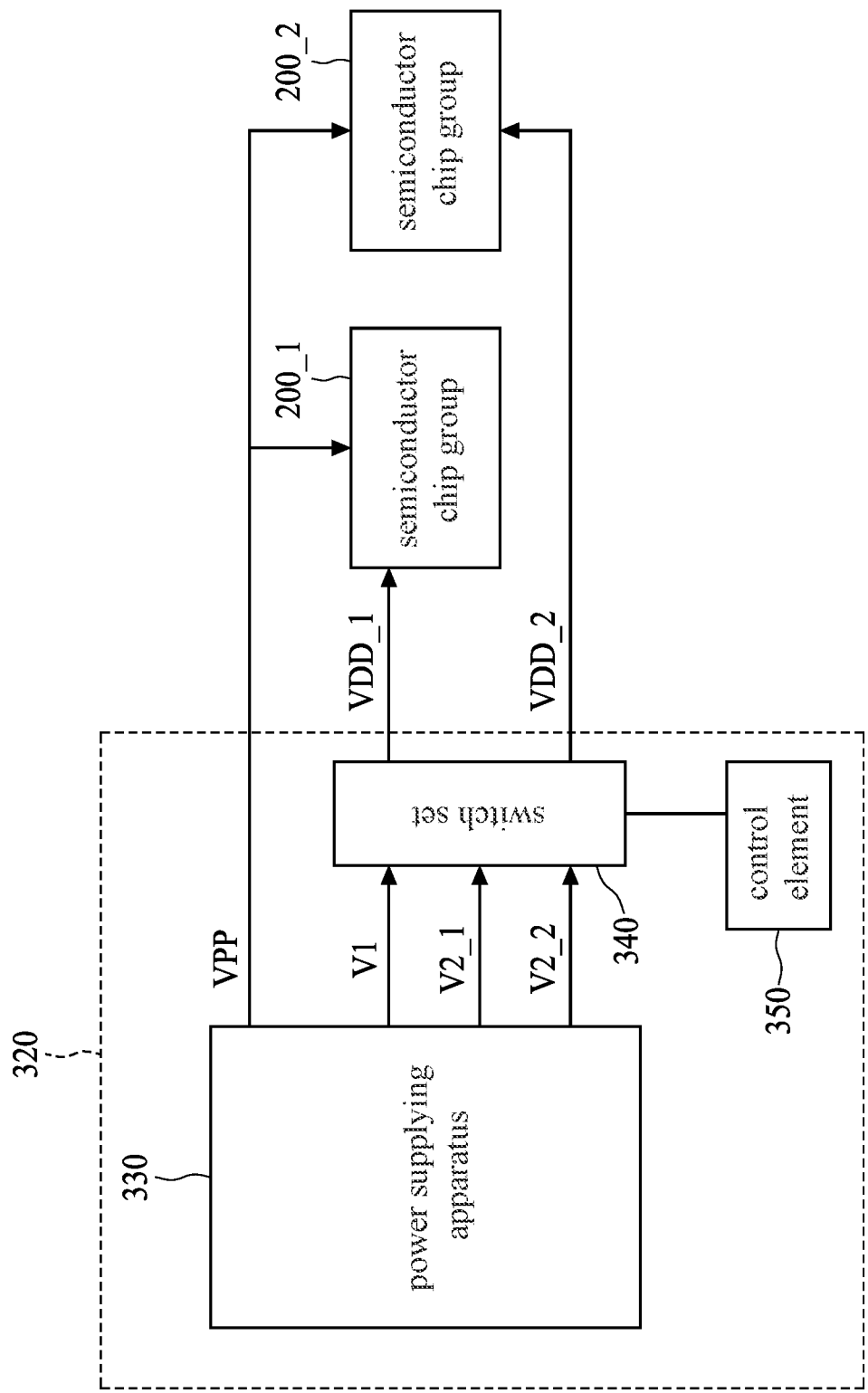
FIG. 5 a circuit block diagram illustrating a signal source and the tested object in accordance with one embodiment of the present disclosure.
Figure 6:
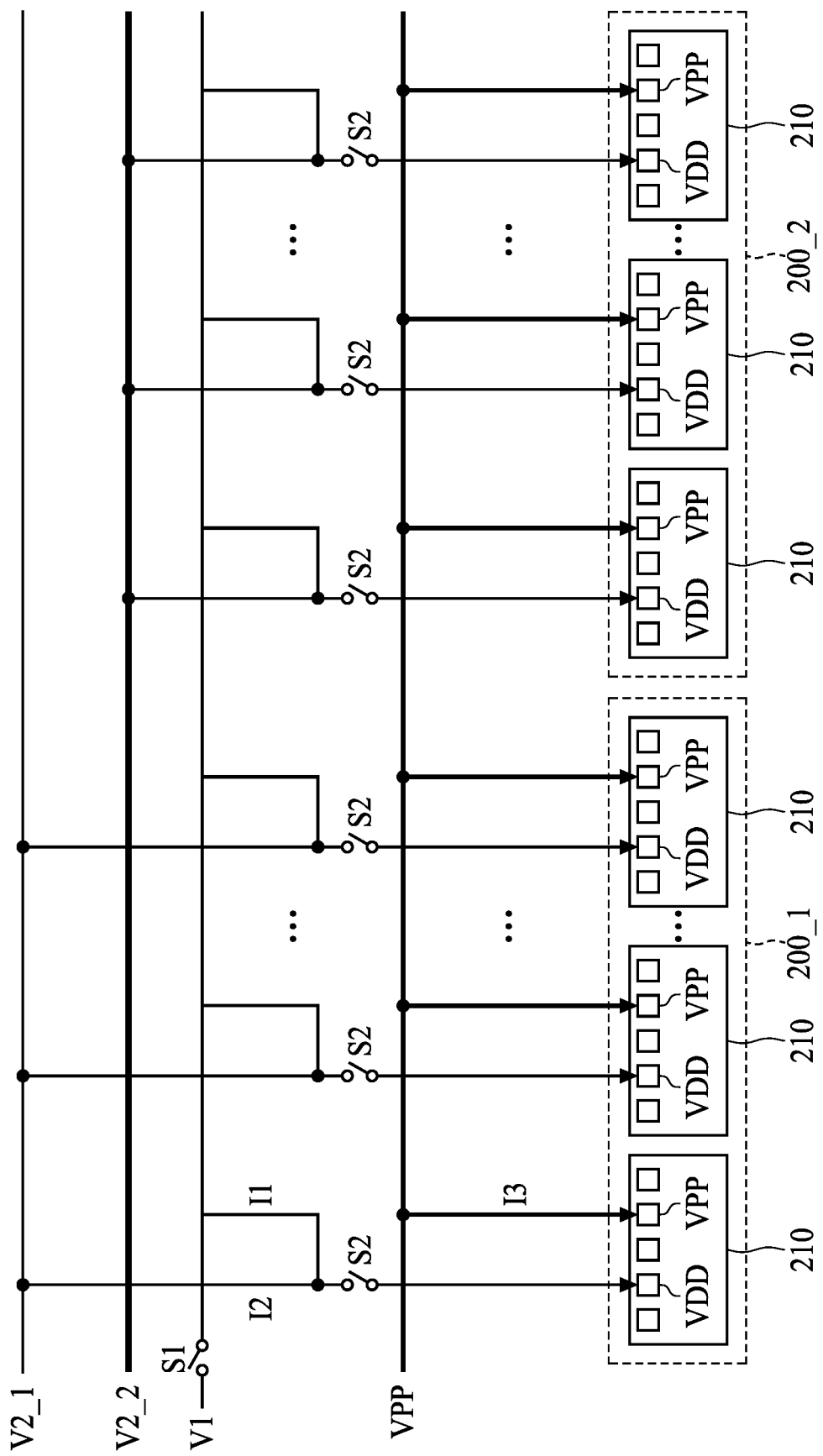
FIG. 6 is a circuit diagram illustrating the signal source and the tested object in accordance with one embodiment of the present disclosure.

FIG. 5 illustrates a functional block diagram of the signal source 320 and the tested object 20 in accordance with one embodiment of the present disclosure. FIG. 6 illustrates a circuit diagram of the signal source 320 and the tested object 20 in accordance with one embodiment of the present disclosure. With reference to FIGS. 5 and 6, the tested object 20 includes two semiconductor chip groups 200_1 and 200_2. Each of the semiconductor chip groups 200_1 and 200_2 may include a plurality of semiconductor chips 210. In some embodiments, all the semiconductor chip groups 200_1 and 200_2 have the same number of semiconductor wafers 210.

With reference to FIGS. 5 and 6, the signal source 320 may be configured to generate two supply voltages VDD_1, VDD_2, and a programmable voltage VPP. When the semiconductor chips 210 are dynamic random-access memories, the supply voltages VDD_1 and VDD_2 are used to activate or drive the semiconductor chips 210, and the programmable voltage VPP is used to provide voltages to the word lines of the semiconductor chips 210. Furthermore, when the semiconductor chips 210 are Double-Data-Rate Fourth Generation Synchronous Dynamic Random Access Memories (DDR4 SDRAM), the supply voltages VDD_1, VDD_2 are 1.2 V, and the programmable voltage VPP is 2.5 V.

With reference to FIGS. 5 and 6, the signal source 320 may include a power supplying apparatus 330, a switch set 340, and a control element 350. The power supplying apparatus 330 may be configured to generate an additional voltage V1 and a plurality of base voltages V2_1, V2_2. The switch set 340 is disposed between the power supplying apparatus 330 and the semiconductor chip groups 200_1 and 200_2. The switch set 340 is controlled by the control element 350 to convert the additional voltage V1 and the base voltages V2_1, V2_2 generated by the power supplying apparatus 330 into the supply voltages VDD_1, VDD_2.

With reference to FIG. 6, the switch set 340 includes a first switch S1 and a plurality of second switches S2. The number of the second switches S2 is equal to the number of the semiconductor chips 210. The second switches S2 are coupled between the power supplying apparatus 330 and the semiconductor chips 210. Specifically, each second switch S2 is connected in series with a semiconductor chip 210 to form a switching circuit. A plurality of switching circuits composed of a plurality of second switches S2 and a plurality of semiconductor chips 210 are connected in parallel. When the second switches S2 receive the control signal generated from the control element 350 and switches to the conducting state, the base current I2 enters each semiconductor chip 210 to perform an electrical test. In addition, the first switch S1 is coupled between the power supplying apparatus 330 and the semiconductor chips 210. When the first switch S1 receives the control signal provided by the control element 350 and switches to the conducting state, the semiconductor chips 210 are connected in parallel, and the first switch S1 is connected in series between the power supplying apparatus 330 and a plurality of parallel-connected semiconductor chips 210.

Furthermore, with reference to FIG. 6, when the first switch S1 and the second switches S2 switch to the conducting state at the same time, the additional current I1 and the base current I2 flow through the second switches S2 together and enter the semiconductor chips 210 to perform an electrical test. The base current I2 is greater than the additional current I1. For example, the additional current I1 may be 100 mA, and the base current I2 may be 200 mA. In other words, the power supplying apparatus 330 may provide a current of 300 mA to the semiconductor chips 210 to activate the semiconductor chips 210.

In addition, with reference to FIG. 6, the signal source 320 may further generate a programmable voltage VPP to each semiconductor chip 210. When the programmable voltage VPP is applied to the semiconductor chips 210, a programmable current I3 enters the semiconductor chips 210. The programmable current I3 may be 100 mA, for example.

With the aforementioned circuit configuration, the control element 350 may determine whether each semiconductor chip 210 can operate normally by changing the state of the first switch S1 and each second switch S2. For example, when the power supplying apparatus 330 does not provide the programmable voltage VPP to the semiconductor chip 210, the components and electrical paths in the semiconductor chip 210 may be determined damaged if the semiconductor chips 210 still capable of performing the writing test and reading test.

Figure 7:
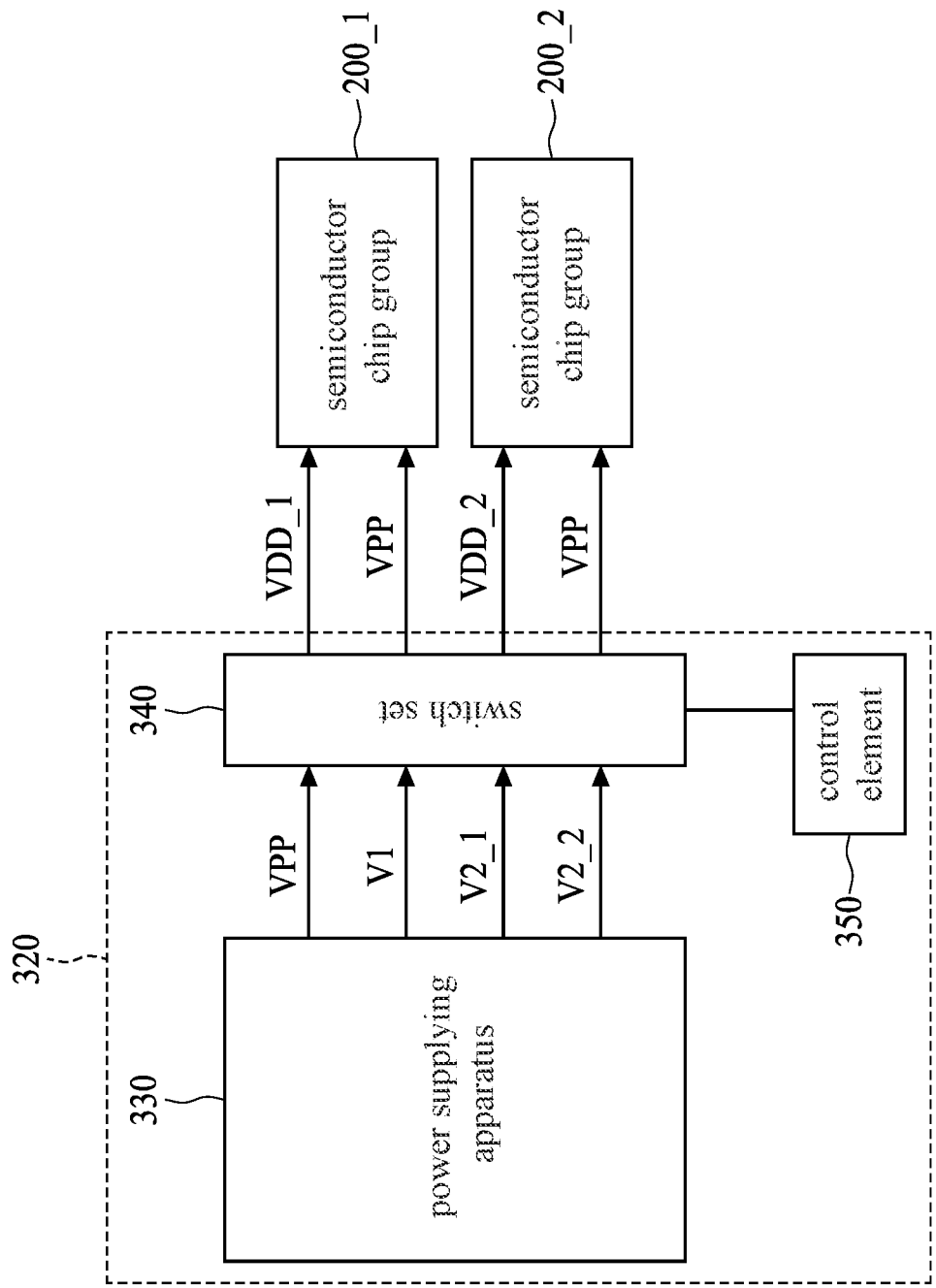
FIG. 7 a circuit block diagram illustrating the signal source and the tested object in accordance with one embodiment of the present disclosure.
Figure 8:
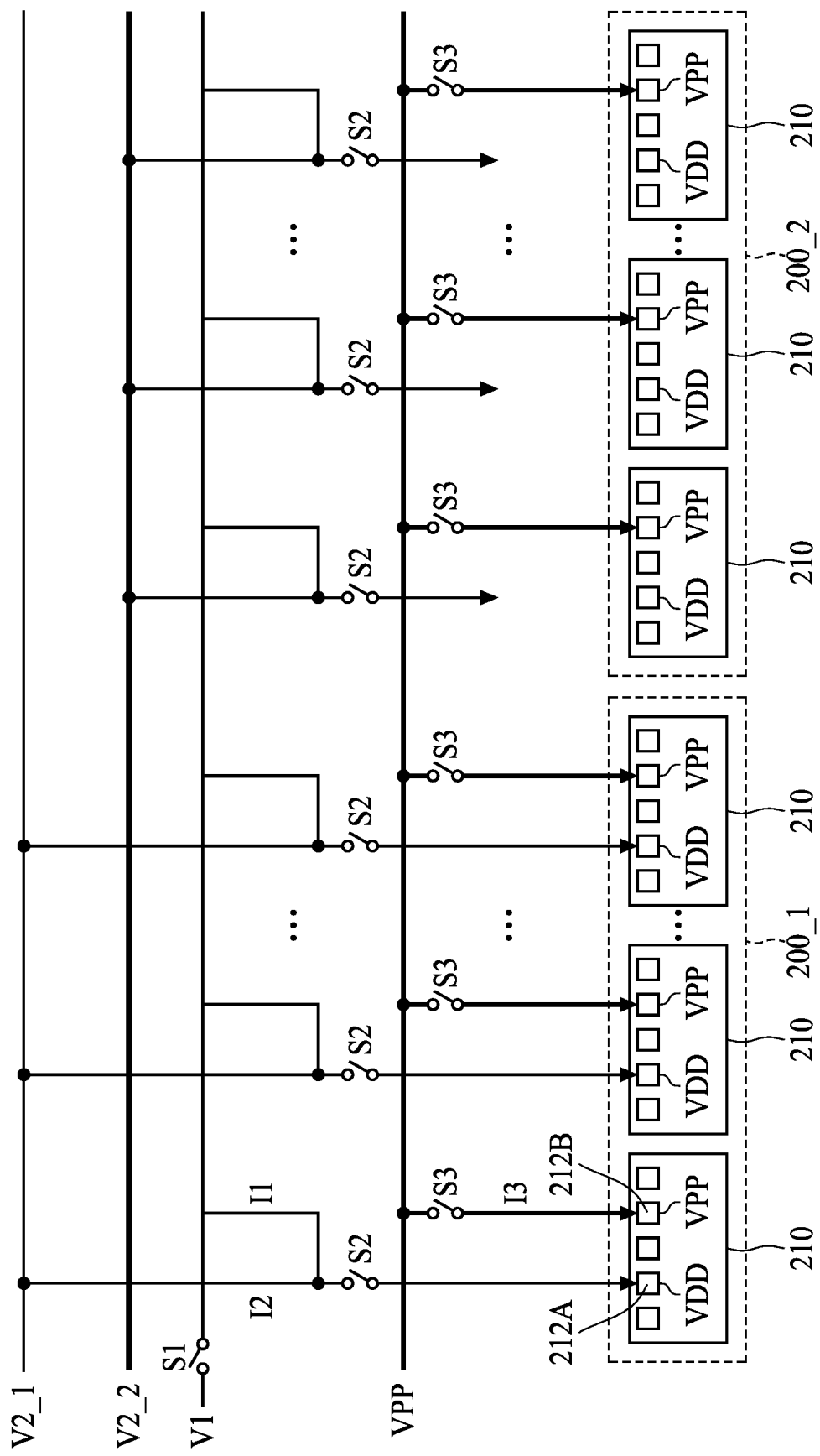
FIG. 8 is a circuit diagram illustrating the signal source and the tested object in accordance with one embodiment of the present disclosure.

FIG. 7 illustrates a functional block diagram of the signal source 320 and the tested object 20 in accordance with one embodiment of the present disclosure. FIG. 8 illustrates a circuit diagram of the signal source 320 and the tested object 20 in accordance with one embodiment of the present disclosure. With reference to FIGS. 7 and 8, the tested object 20 includes two semiconductor chip groups 200_1 and 200_2. Each of the semiconductor chip groups 200_1 and 200_2 may include a plurality of semiconductor chips 210. In some embodiments, the semiconductor chip groups 200_1 and 200_2 have the same number of semiconductor chips 210.

With reference to FIGS. 7 and 8, the signal source 320 may include a power supplying apparatus 330, a switch set 340, and a control element 350. The power supplying apparatus 330 may be configured to generate an additional voltage V1, a plurality of base voltages V2_1, V2_2, and a programmable voltage VPP. The programmable voltage VPP, the additional voltage V1, and the base voltages V2_1, V2_2 are transmitted to the switching collection 340 from different output terminals of the power supplying apparatus 330.

With reference to FIGS. 7 and 8, the switch set 340 is disposed between the power supplying apparatus 330 and the semiconductor chip groups 200_1 and 200_2. The switch set 340 transmits at least one of the programmable voltage VPP, the additional voltage V1, and the base voltages V2_1, V2_2 to the semiconductor chip groups 200_1 and 200_2 according to the control signal generated from the control element 350. Specifically, the switch set 340 includes a first switch S1, a plurality of second switches S2, and a plurality of third switches S3. When the second switches S2 switch to the conducting state, the base current I2 enters the semiconductor chips 210 through the first contact pad 212A. In addition, when the first switch S1 switches to the conducting state, the additional current I1 enters the semiconductor chips 210 through the first contact pad 212A.

Furthermore, when the first switch S1 and the second switches S2 switch to the conducting state at the same time, the additional current I1 and the base current I2 flow through the second switches S2 together and enter the semiconductor chips 210 through the first contact pad 212A, thereby activating the semiconductor chips 210. In addition, when the third switches S3 switch to the conducting state, the programmable current I3 enters the semiconductor chips 210 through a second contact pad 212B.

According to the aforementioned circuit configuration, by changing the state of the first switch S1 and each second switch S2, it is possible to determine whether each semiconductor chip 210 can operate normally. For example, when the power supplying apparatus 330 does not provide the programmable voltage VPP to the semiconductor chips 210, the components and electrical paths in the semiconductor chip 210 may be determined damaged if the semiconductor chip 210 still capable of performing the writing test and reading test.

Figure 9:
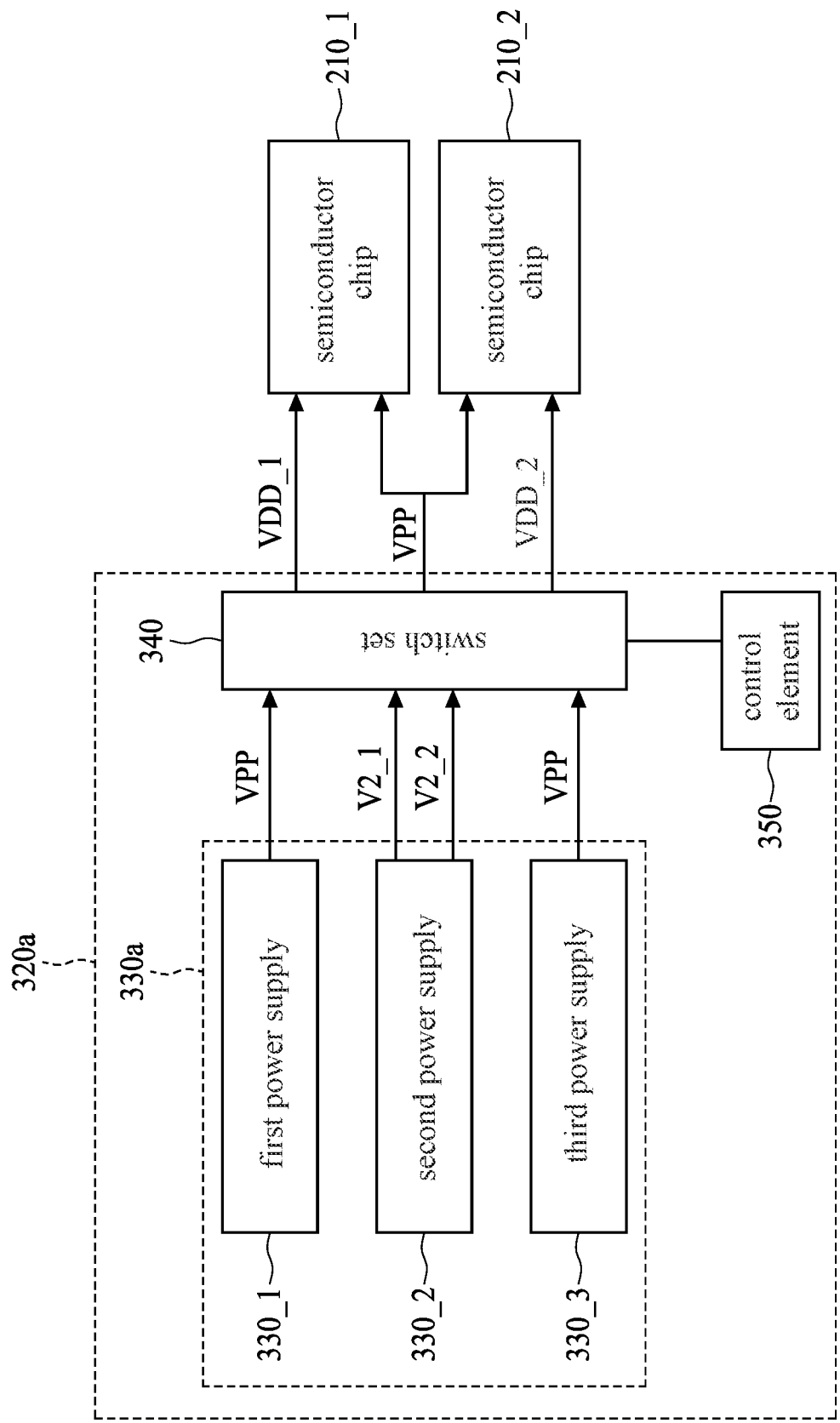
FIG. 9 a circuit block diagram illustrating the signal source and the tested object in accordance with one embodiment of the present disclosure.
Figure 10:
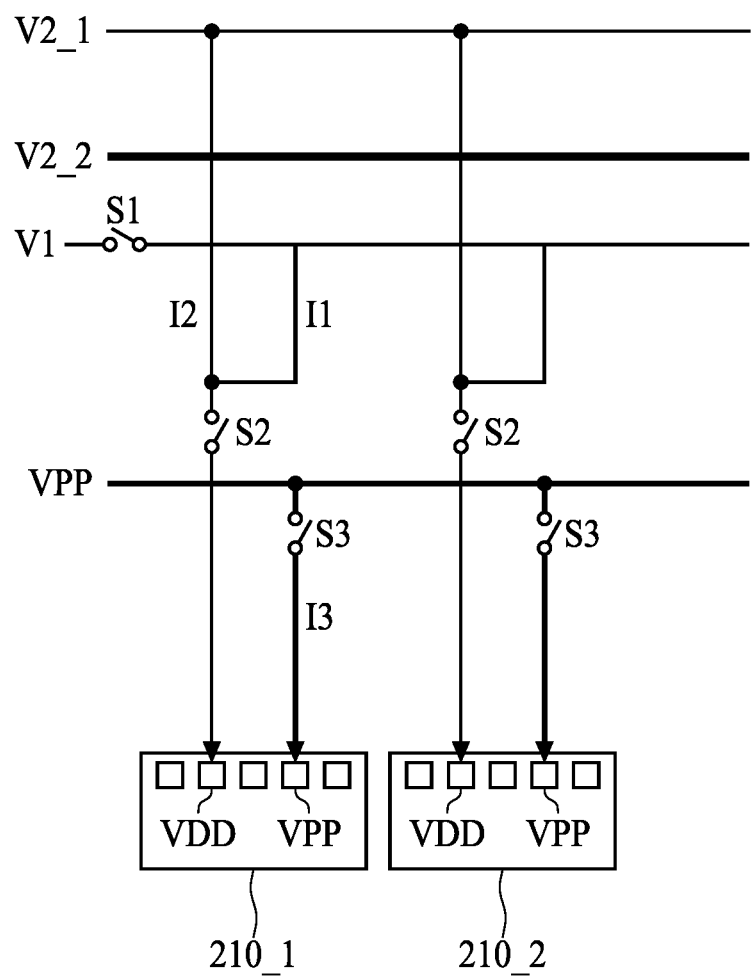
FIG. 10 is a circuit diagram illustrating the signal source and the tested object in accordance with one embodiment of the present disclosure.

FIG. 9 illustrates a functional block diagram of the signal source 320a and the tested object 20 in accordance with one embodiment of the present disclosure. FIG. 10 illustrates a circuit diagram of the signal source 320a and the tested object 20 in accordance with one embodiment of the present disclosure. With reference to FIGS. 9 and 10, the tested object 20 includes two semiconductor chips 210_1 and 210_2.

The signal source 320a may include a power supplying apparatus 330a, a switch set 340, and a control element 350. The power supplying apparatus 330a includes a first power supply 330_1, a second power supply 330_2, and a third power supply 330_3. The first power supply 330_1 is configured to generate an additional voltage V1, the second power supply 330_2 is configured to generate two basic voltages V2_1, V2_2, and the third power supply 330_3 is configured to generate a programmable voltage VPP. The switch set 340 is disposed between the power supplying apparatus 330a and the semiconductor chips 210_1 and 210_2. The switch set 340 is controlled by the control element 350 to convert the additional voltage V1 and the base voltages V2_1 and V2_2 generated by the power supplying apparatus 330a into the supply voltages VDD_1, VDD_2.

With reference to FIGS. 9 and 10, the switch set 340 includes a first switch S1 and a plurality of second switches S2. The number of second switches S2 is equal to the number of semiconductor chips 210_1 and 210_2. The second switches S2 are coupled between the power supplying apparatus 330a and the semiconductor chips 210_1 and 210_2. Specifically, each second switch S2 is connected in series with a semiconductor chip 210_1 and 210_2 to form a switching circuit. A plurality of switching circuits composed of a plurality of second switches S2 and a plurality of semiconductor chips 210_1 and 210_2 are connected in parallel. When the second switches S2 receive the control signal generated from the control element 350 and switch to the conducting state, the base current I2 enters each of the semiconductor chips 210_1 and 210_2 to perform an electrical test. In addition, the first switch S1 is coupled between the power supplying apparatus 330a and the semiconductor chips 210_1 and 210_2. When the first switch S1 receives the control signal provided by the control element 350 and switches to the conducting state, the semiconductor chips 210_1 and 210_2 are connected in parallel, and the first switch S1 is connected in series between the power supply apparatus 330a and a plurality of parallel-connected semiconductor chips 210_1 and 210_2.

Furthermore, when the first switch S1 and the second switches S2 switch to the conducting state at the same time, the additional current I1 and the base current I2 form a combined current, which flows through the second switches S2 together and enters the semiconductor chips 210_1 and 210_2 to perform an electrical test. The base current I2 is greater than the additional current I1. For example, the additional current I1 may be 100 mA, and the base current I2 may be 200 mA. In other words, the power supplying apparatus 330a may provide a current of 300 mA to the semiconductor chips 210_1 and 210_2 to activate the semiconductor chips 210_1 and 210_2.

In addition, the third power supply 330_3 of the signal source 320 generates the programmable voltage VPP to the semiconductor chips 210_1 and 210_2. When the third switches S3 switch to the conducting state, the third power supply 330_3 applies the programmable voltage VPP on the semiconductor chips 210_1 and 210_2, and the programmable current I3 enters each of the semiconductor chips 210_1 and 210_2. The programmable current I3 may be 100 mA, for example.

With the aforementioned circuit configuration, the control element 350 may determine whether each of the semiconductor chips 210_1 and 210_2 can operate normally by changing the state of the first switch S1 and each second switch S2. For example, when the power supplying apparatus 330a does not provide the programmable voltage VPP to the semiconductor chips 210_1 and 210_2, the components and electrical paths in the semiconductor chips 210_1 and 210_2 may be determined damaged if the semiconductor chips 210_1 and 210_2 still capable of performing the writing test and reading test.

The present disclosure provides a signal source for providing a plurality of supply voltages and a programmable voltage to a plurality of semiconductor chip groups. The signal source includes a power supplying apparatus and a switch set. The power supplying apparatus is configured to generate an additional voltage, a plurality of base voltages, and the programmable voltage. A switch set is disposed between the power supplying apparatus and the plurality of semiconductor chip groups, and is used to convert the additional voltage and the base voltages into the supply voltages.

It should be noted that the functions or steps noted herein may occur in an order different from the order noted in the figures. For example, two figures shown in succession may in fact be executed substantially concurrently or may sometimes be executed in a reversed order, depending upon the functionalities or steps involved.

Although the present disclosure and its advantages have been described in detail, it should be understood that various changes, substitutions and alterations may be made herein without departing from the spirit and scope of the disclosure as defined by the appended claims. For example, many of the processes discussed above may be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, and steps.

What is claimed is:

1. A signal source for testing a plurality of semiconductor chip groups, comprising:
a power supplying apparatus configured to generate an additional voltage, a plurality of base voltages, and a programmable voltage, wherein the programmable voltage generated by the power supplying apparatus is configured as a command for performing writing and reading tests on the semiconductor chip groups; and
a switch set disposed between the power supplying apparatus and the semiconductor chip groups, wherein the switch set converts the additional voltage and the base voltages into a plurality of supply voltages as a plurality of power signals required for performing the writing and reading tests on the semiconductor chip groups respectively;
wherein the switch set comprises a first switch coupled between the power supplying apparatus and the semiconductor chip groups and located on a transmission path of the additional voltage;
wherein the switch set comprises a plurality of second switches electrically coupled between the power supplying apparatus and the semiconductor chip groups and located on the transmission path of the base voltages;
wherein the additional voltage is transmitted to the semiconductor chip groups through the second switches, wherein the second switches are configured for electrically connecting the semiconductor chip groups in series, wherein when the first switch is switched to an open state, the additional voltage is not transmitted to the first chip and the second chip to each of the semiconductor chip groups.

2. The signal source of claim 1, wherein when the second switches switch to a conducting state, the power supplying apparatus provides a base current to each of the semiconductor chip groups; when the first switch switches to a conducting state and the second switches switch to the conducting state at the same time, the power supplying apparatus provides an additional current and the base current through the second switches together to each of the semiconductor chip groups, wherein the additional current is less than the base current.

3. The signal source of claim 1, wherein the switch set further comprises a plurality of third switches coupled between the power supplying apparatus and the semiconductor chip groups and located on a transmission path of the programmable voltage, wherein the third switches are controlled to transmit a programmable current to each of the semiconductor groups in response to the programmable voltage.

4. The signal source of claim 3, wherein when the plurality of third switches switch to a conducting state, the power supplying apparatus provides the programmable current to each of the semiconductor chip groups through one of the third switches, wherein the programmable current is less than the additional current.

5. The signal source of claim 4, wherein the programmable current is less than the base current.

6. The signal source of claim 3, further comprising a controller electrically connected to the first switch, the second switches, and wherein the third switches, the first switch, the second switches, and the third switches are controlled by the controller and switch between the conducting state and an open circuit state.

7. The signal source of claim 1, wherein the power supplying apparatus comprises:
a first power supply configured to generate the additional voltage;
a second power supply configured to generate the base voltages; and
a third power supply configured to generate the programmable voltage;
wherein the first power supply, the second power supply, and the third power supply are independent power supplies.

8. A testing system, comprising:
a first chip;
a second chip; and
a power supplying apparatus, comprising:
a first switch;
a two second switches;
a first power supply configured to generate an additional current; and
a second power supply configured to generate a first base current and a second base current;
wherein when the first switch switches to a conducting state, the additional current is supplied to the first chip and the second chip;
wherein when the second switches switch to a conducting state, the first base current and the second base current are supplied to the first chip and the second chip respectively;
wherein when the first switch and the second switches switch to the conducting state, the additional current and the first base current are supplied to the first chip while the additional current and the second base current are supplied to the second chip.

9. The testing system of claim 8, wherein the additional current of the first power supply is transmitted to the first chip and the second chip through the first switch when the first switch is switched to the conducting state, wherein when the first switch is switched to an open state, the additional current is not transmitted to the first chip and the second chip, such that only the first base current and the second base current are supplied to the first chip and the second chip respectively when the second switches switch to the conducting state.

10. The testing system of claim 9, wherein the additional current of the first power supply and the first base current and the second base current of the second power supply are transmitted to the first chip and the second chip through the second switches respectively.

11. The testing system of claim 8, further comprising a third power supply configured to generate a programmable voltage to the first chip and the second chip.

12. The testing system of claim 11, wherein the first chip further comprises a first contact pad, the second chip further comprises a second contact pad, and the programmable voltage enters the first chip through the first contact pad, the programmable voltage enters the second chip through the second contact pad, wherein the first power supply, the second power supply, and the third power supply are independent power supplies.

13. The testing system of claim 11, further comprising a plurality of third switches, the programmable voltage of the third power supply is transmitted to the first chip and the second chip through the third switches.

14. A power supplying apparatus for a chip group having a first chip and a second chip, comprising:
- a first power supply, providing an additional current;
- a second power supply, providing a base current;
- a third power supply configured to provide a programmable current configured for transmitting to the first chip and the second chip;
- a first switch; and
- a plurality of second switches;
- wherein the first power supply, the second power supply, and the third power supply are independent power supplies;
- wherein the first power supply is electrically coupled to the second power supply to generate a combined current of the additional current and the base current for transmitting to the first chip and the second chip;
- wherein the additional current of the first power supply is transmitted to the first chip and the second chip though the first switch, wherein when the first switch switches to a conducting state, the additional current is supplied to the first chip and the second chip, wherein when the first switch is switched to an open state, the additional current is not transmitted to the first chip and the second chip;
- wherein the additional current of the first power supply and the base current of the second power supply are transmitted to the first chip and the second chip through the second switches respectively, wherein when the second switch is switched to an open state, the additional current and the base current are not transmitted to the first chip and the second chip.

15. The power supplying apparatus of claim 14, wherein the first chip further comprises a first contact pad, the second chip further comprises a second contact pad, and the programmable current enters the first chip through the first contact pad, the programmable current enters the second chip through the second contact pad.

* * * * *